(12) United States Patent
Koberstein et al.

(10) Patent No.: US 11,563,247 B2
(45) Date of Patent: Jan. 24, 2023

(54) COLD AMBIENT BATTERY COOLING UTILIZING THE CLIMATE CABIN HEATING SYSTEM

(71) Applicant: Ford Global Technologies, LLC, Dearborn, MI (US)

(72) Inventors: Manfred Koberstein, Troy, MI (US); Jennifer A. Herr-Rathke, Plymouth, MI (US); William Stewart Johnston, South Lyon, MI (US); Hamish Lewis, Troy, MI (US); Christian Brent Schoeneman, Southgate, MI (US); Alan Gutowski, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 461 days.

(21) Appl. No.: 16/601,763

(22) Filed: Oct. 15, 2019

(65) Prior Publication Data
US 2021/0111448 A1    Apr. 15, 2021

(51) Int. Cl.
| | |
|---|---|
| H01M 10/00 | (2006.01) |
| H01M 10/6562 | (2014.01) |
| H01M 10/625 | (2014.01) |
| B60H 1/00 | (2006.01) |
| H01M 10/635 | (2014.01) |
| B60L 58/26 | (2019.01) |
| H01M 10/613 | (2014.01) |

(52) U.S. Cl.
CPC .... *H01M 10/6562* (2015.04); *B60H 1/00278* (2013.01); *B60L 58/26* (2019.02); *H01M 10/613* (2015.04); *H01M 10/625* (2015.04); *H01M 10/635* (2015.04)

(58) Field of Classification Search
CPC ............ H01M 10/657; H01M 10/615; H01M 10/625; Y02E 60/10
See application file for complete search history.

(56) References Cited

U.S. PATENT DOCUMENTS

| | | |
|---|---|---|
| 5,606,239 A | 2/1997 | Schumann |
| 5,647,450 A | 7/1997 | Ogawa et al. |
| 6,029,762 A | 2/2000 | Kepner |
| 6,290,593 B1 | 9/2001 | Weissbrich et al. |
| 6,362,594 B2 | 3/2002 | Kajiura |
| 6,481,230 B2 | 11/2002 | Kimishima et al. |
| 7,872,443 B2 | 1/2011 | Ward |
| 8,350,526 B2 | 1/2013 | Dyer et al. |
| 9,000,724 B2 | 4/2015 | Minami |
| 9,020,668 B2 | 4/2015 | Park et al. |

(Continued)

*Primary Examiner* — Cynthia H Kelly
*Assistant Examiner* — Monique M Wills
(74) *Attorney, Agent, or Firm* — Vichit Chea; Price Heneveld LLP

(57) ABSTRACT

A cold ambient battery chilling mode of an electric vehicle may be implemented if the vehicle battery is being charged when the ambient air temperature is low and a temperature of the battery is elevated. During cold ambient charging, coolant flows through a heater core and through a battery heat exchanger. Cold ambient air may be utilized to cool the coolant flowing through the heater core, and coolant from the heater core flows through the battery heat exchanger and cools the battery during charging. A battery chiller may be deactivated when the cold ambient battery chilling mode is activated to reduce energy consumption.

16 Claims, 6 Drawing Sheets

(56) References Cited

U.S. PATENT DOCUMENTS

| | | |
|---|---|---|
| 9,174,544 B2 | 11/2015 | Origuchi et al. |
| 9,233,618 B2 | 1/2016 | Dyer et al. |
| 9,391,472 B2 | 7/2016 | Iyasu et al. |
| 9,431,849 B2 | 8/2016 | Yan et al. |
| 9,612,041 B2 | 4/2017 | Kawakami et al. |
| 9,620,830 B2 | 4/2017 | Chan et al. |
| 9,780,422 B2 | 10/2017 | Dunn et al. |
| 9,873,350 B2 | 1/2018 | Martin et al. |
| 9,937,816 B2 | 4/2018 | Marchal et al. |
| 9,991,574 B2 | 6/2018 | Nakagawa et al. |
| 2016/0351981 A1 | 12/2016 | Porras et al. |
| 2020/0122545 A1* | 4/2020 | Lee .................... B60H 1/00278 |
| 2020/0171916 A1* | 6/2020 | Shrivastava ....... B60H 1/00807 |

* cited by examiner

COLD AMBIENT BATTERY COOLING UTILIZING THE CLIMATE CABIN HEATING SYSTEM

FIELD OF THE INVENTION

The present invention generally relates to electric vehicles, and in particular to a method of cooling a battery of an electric vehicle while the battery is being charged.

BACKGROUND OF THE INVENTION

Various climate control (HVAC) systems for motor vehicles have been developed. Existing HVAC systems may be configured to control a temperature of a vehicle cabin by heating or cooling air supplied to the cabin. Electric vehicles may include a thermal control system to control a temperature of a vehicle battery. The battery thermal control system of an electric vehicle may be operably interconnected with a cabin HVAC system of an electric vehicle.

SUMMARY OF THE INVENTION

One aspect of the present disclosure is a method of implementing or activating a cold ambient battery chilling mode in an electric vehicle having a battery charging system and a thermal control system including a cabin thermal control (liquid coolant) circuit that is operably connected to a battery thermal control (liquid coolant) circuit. The method includes determining if predefined cold ambient battery chilling mode criteria include: 1) the vehicle battery charging system is activated; 2) the electric vehicle is stopped; 3) the ambient temperature is below a predefined cold ambient temperature; 4) the vehicle battery charging system is in a charge (e.g., fast charge) mode or state; and 5) a temperature of the battery is above a predefined fast charge temperature. If the predefined cold ambient battery chilling mode is satisfied, the cold ambient battery chilling mode is implemented by 1) causing (or allowing) ambient air to cool a heater core of the cabin thermal control circuit; 2) causing (or allowing) coolant to flow from the heater core of the cabin thermal control circuit to a battery heat exchanger that is thermally coupled to the vehicle battery to thereby cool the vehicle battery during charging of the vehicle battery; and 3) causing (or allowing) coolant that has been heated by the battery heat exchanger to flow through the heater core of the cabin thermal control circuit to reduce a temperature of the coolant exiting the heater core.

Embodiments of the first aspect of the disclosure can include any one or a combination of the following features:
The cabin thermal control (liquid) circuit may include an electric heater that is configured to heat coolant entering the heater core, a first pump that is configured to circulate coolant in the cabin thermal control (liquid) circuit, and a first valve that is configured to selectively interconnect the cabin thermal control (liquid) circuit to the battery thermal control (liquid) circuit whereby the valve prevents flow of coolant from the cabin thermal control (liquid) circuit to the battery thermal control (liquid) circuit when the first valve is in a first state, and causes coolant to flow to the heater core from the cabin thermal control (liquid) circuit when the first valve is in a second state.
Coolant may be caused to flow from the heater core of the cabin thermal control (liquid) circuit to the battery heat exchanger by shifting the first valve from the first state to the second state.
The electric heater may be turned off when the first valve is in the second state.
The battery thermal control (liquid) circuit may include a battery chiller that is configured to cool coolant before the coolant enters the battery heat exchanger when the battery chiller is activated.
The battery thermal control (liquid) circuit may include a pump that is configured to circulate coolant in the battery thermal control circuit, and a second valve that is configured to direct coolant exiting the battery heat exchanger to the battery chiller when the second valve is in a first state, and to direct coolant exiting the battery heat exchanger to the cabin thermal control circuit when the second valve is in a second state.
The second valve may be in the second state when the first valve is in the second state.
The method may include deactivating the battery chiller when the second valve is in the second state.
The electric vehicle may include a control system that may include an electric vehicle control module (EVCM) that is operably connected to a climate control module (CCM).
The EVCM may optionally be configured to control the flow of coolant in the cabin thermal control circuit and in the battery thermal control circuit.
The method may optionally include causing the EVCM to shift the first valve from the first state to the second state.
The method may optionally include causing the EVCM to shift the second valve to the second state.
The method may optionally include causing the EVCM to deactivate the battery chiller.
The method may optionally include causing the EVCM to turn off the electric heater.

Another aspect of the present disclosure is a method of operating an electric vehicle battery charging and thermal control system in an electric vehicle. The method includes determining if predefined cold ambient battery chilling mode criteria exist. When predefined cold ambient battery chilling mode criteria do exist, a cold ambient battery chilling mode is implemented by causing coolant to flow through a heater core of a cabin heater to cool the coolant, and coolant exiting the heater core flows through a battery heat exchanger to cool the battery. A battery chiller is deactivated when the cold ambient battery chilling mode is implemented.

Embodiments of the second aspect of the disclosure can include any one or a combination of the following features:
The predefined cold ambient battery chilling mode criteria may include one or more of 1) the electric vehicle is charging, 2) the electric vehicle is not moving, 3) the battery requires cooling according to predefined battery cooling criteria.
The predefined battery cooling criteria may optionally include a temperature of the battery.
The predefined battery cooling criteria may optionally include a battery temperature at which battery power is reduced.
The thermal control system may optionally include a cabin liquid coolant circuit that is operably connected to a battery liquid coolant circuit.
The cabin liquid coolant circuit may optionally include an electric heater that is configured to heat coolant entering the heater core, a pump configured to circulate coolant in the cabin liquid coolant circuit, and a first valve configured to selectively interconnect the cabin liquid coolant circuit to the battery liquid coolant circuit whereby the first valve prevents flow of coolant from the cabin liquid coolant circuit to the heater core when the first valve is in a first state, and causes coolant to flow to the heater core from the cabin liquid coolant circuit when the first valve is in a second state.

The first valve may be shifted from the first state to the second state to cause coolant to flow from the heater core of the cabin liquid coolant circuit to the battery heat exchanger.

The electric heater may be turned off when the cold ambient battery chilling mode is implemented.

The battery liquid coolant circuit may include a battery chiller that is configured to cool coolant before the coolant enters the battery heat exchanger when the battery chiller is activated, a pump configured to circulate coolant in the battery liquid coolant circuit, and a second valve configured to direct coolant exiting the battery heat exchanger to the battery chiller when the second valve is in a first state, and to direct coolant exiting the battery heat exchanger to the cabin liquid coolant circuit when the second valve is in the second state.

The second valve may be in the second state when the cold ambient battery chilling mode is implemented.

The method may include deactivating the battery chiller when the cold ambient battery chilling mode is implemented.

Another aspect of the present disclosure is an electric vehicle including a battery, a battery charging system, and a thermal control system. The thermal control system includes a cabin liquid coolant circuit having a heater core. The electric vehicle further includes a battery liquid coolant circuit that may be operably connected to the cabin liquid coolant circuit. The battery liquid coolant circuit includes a heat exchanger that is operably coupled to the battery, and a battery chiller. The electric vehicle further includes a controller that is configured to determine if predefined cold ambient battery chilling mode criteria is satisfied. When the predefined cold ambient battery chilling mode criteria is satisfied, the controller is configured to cause cooling of the heater core of the cabin liquid coolant circuit utilizing cold ambient air, and to cause coolant exiting the heater core to cool the battery utilizing the battery heat exchanger. The controller is also configured to cause heated coolant from the battery heat exchanger to flow through the heater core of the cabin liquid coolant circuit, and deactivate the battery chiller.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
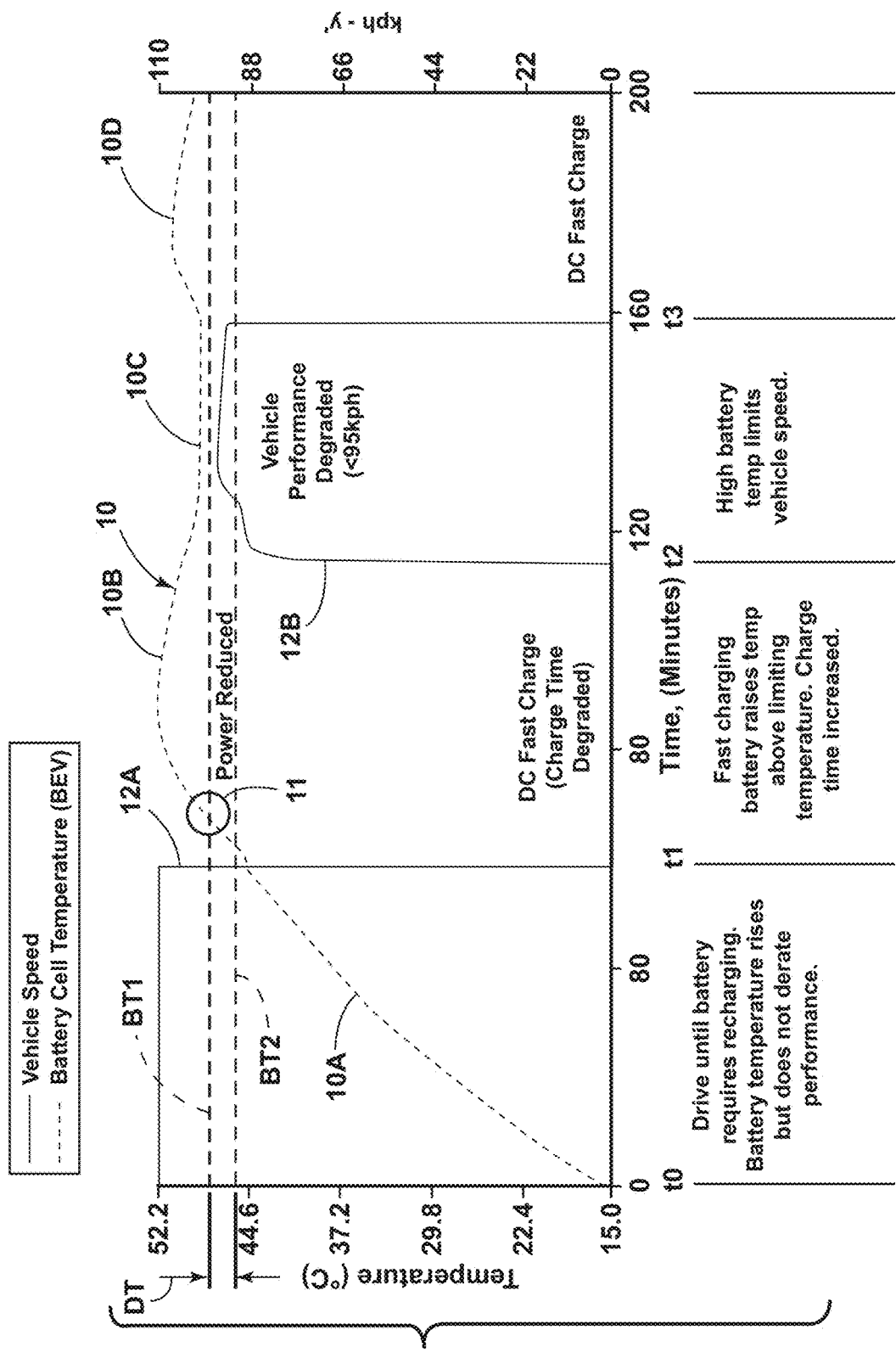
FIG. 1 is a graph showing an example of battery temperature during driving and charging.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

FIG. 1 shows battery temperature (line 10) of an electric vehicle and vehicle speed (line 12) during various operating conditions. The battery temperature 10 may be elevated when the electric vehicle utilizes a large amount of electric power due to towing a trailer and/or traveling at an increased speed during a time interval $t_0$-$t_1$ as shown by the vehicle velocity line segment 12A. During this time interval $t_0$-$t_1$, the battery temperature 10 may increase as shown by the line segment 10A. In the example of FIG. 1, the battery requires charging at time $t_1$, but the battery temperature does not rise above a temperature "BT1" above which battery temperature would limit vehicle performance.

If the vehicle is stopped at time $t_1$ to charge the battery, the battery 4 may be charged in a fast charge mode. Although the vehicle 100 is stopped for charging, the temperature of the battery 4 continues to rise during the charging operation as shown by the line segment 10B. The battery temperature 10 may exceed a "Power Reduced" battery temperature (like BT1) at intersection 11 (FIG. 1) during charging (time interval $t_1$-$t_2$). If the electric vehicle is again operated during the time interval $t_2$-$t_3$, the vehicle speed 12B may be degraded due to the elevated battery temperature 10C during the time interval $t_2$-$t_3$ (i.e., the vehicle controller may limit power supplied from the battery to avoid further increases in battery temperature). If the electric vehicle is stopped for charging at time $t_3$, and a fast battery charge mode is activated (requested), the battery temperature may again increase above the temperature BT1 as shown by the line segment 10D.

Figure 2:
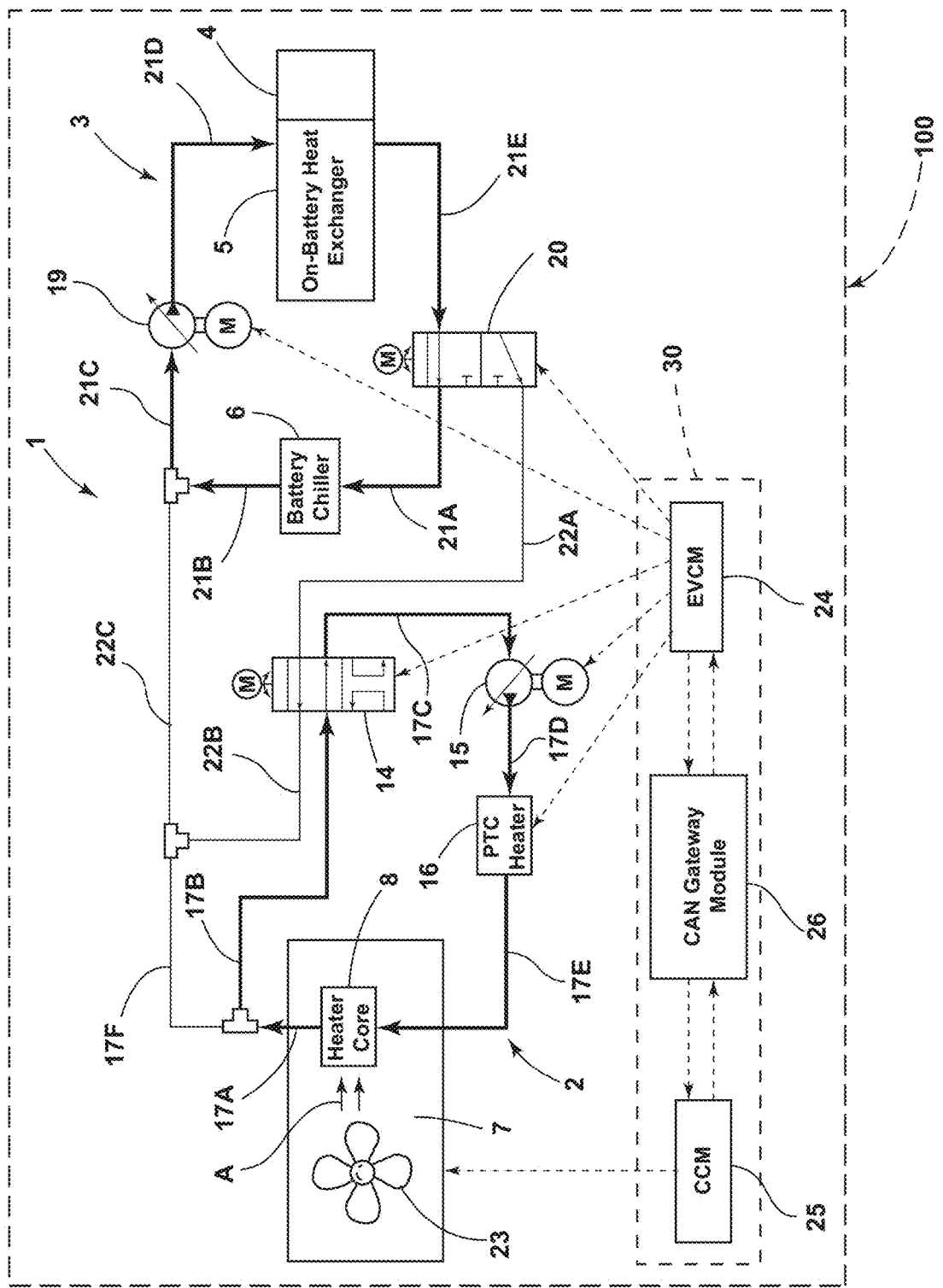
FIG. 2 is a schematic diagram showing a typical prior art operating state of an electric vehicle heating and cooling system.
Figure 3:
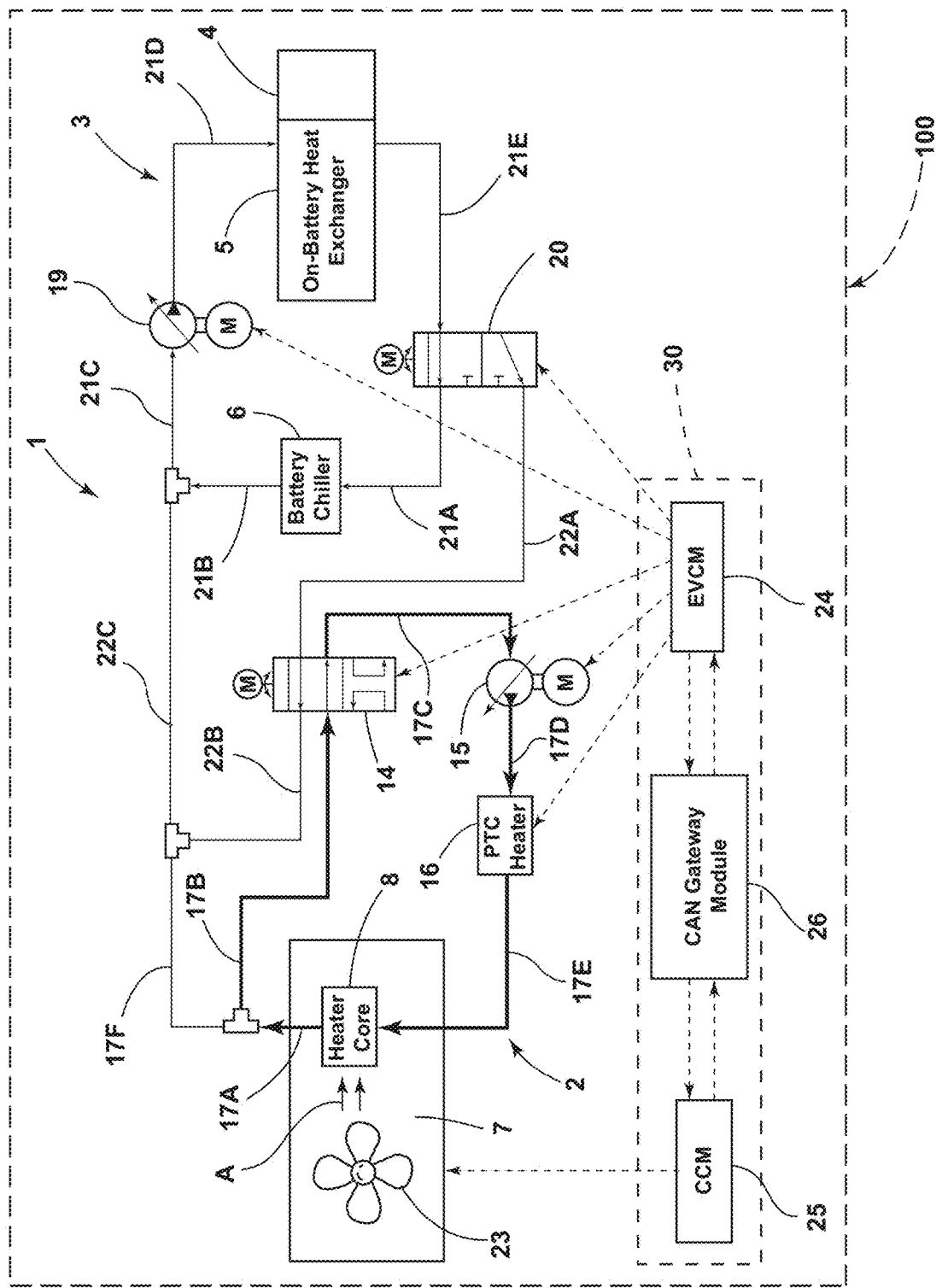
FIG. 3 is a schematic diagram showing operation of an electric vehicle heating and cooling system in a prior art isolated mode in which the battery circuit is not activated to cool the vehicle battery.
Figure 4:
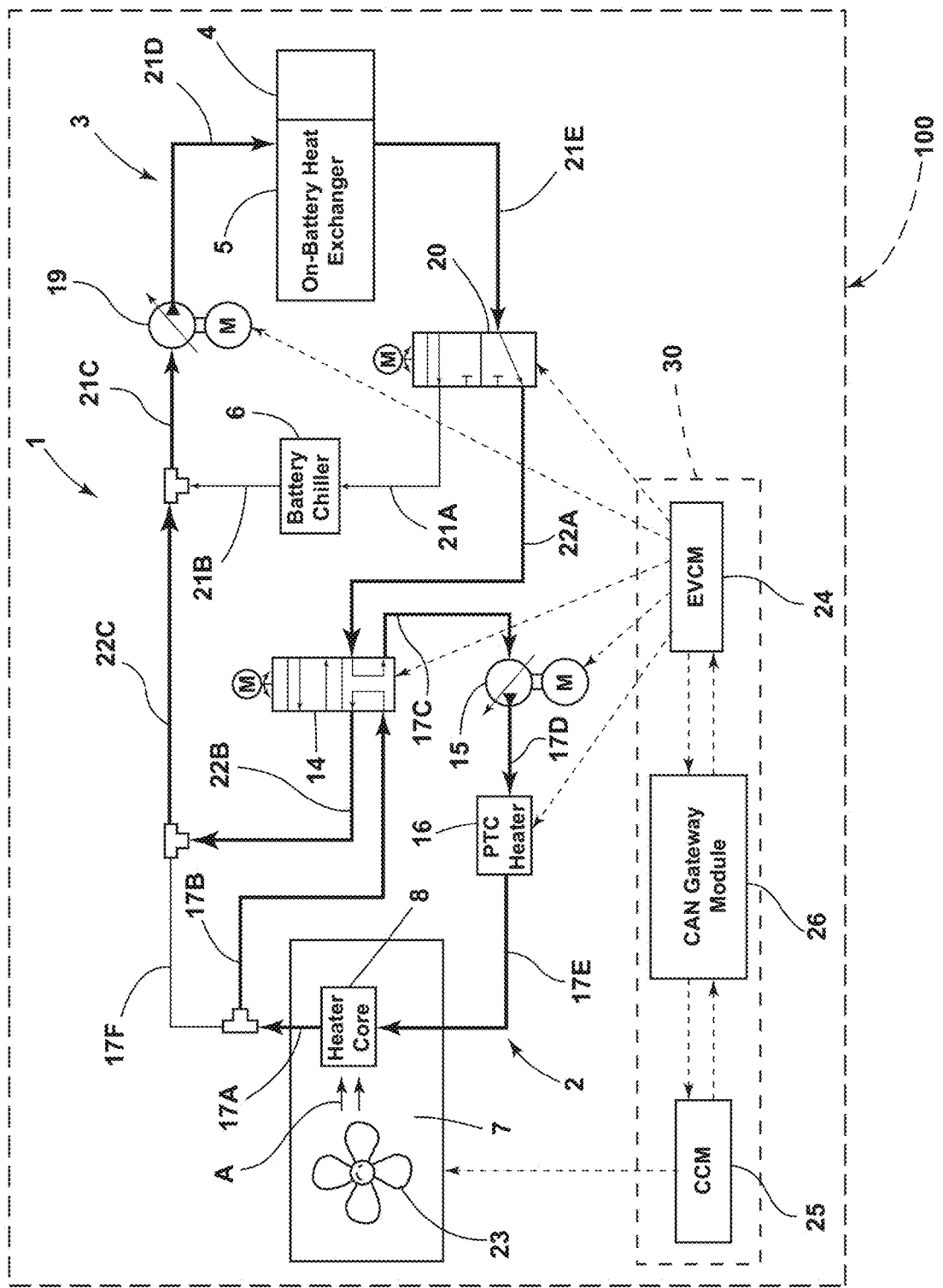
FIG. 4 is a circuit diagram showing an electric vehicle heating and cooling system in a prior art battery heating mode of operation.

With further reference to FIG. 2, an electric vehicle 100 includes a battery 4 and a vehicle heating and cooling system 1. Vehicle heating and cooling system 1 may include a cabin thermal control circuit 2 and a battery thermal control circuit 3. The electric vehicle heating and cooling system 1 may comprise a system that is substantially identical to the system described in U.S. Pat. No. 9,780,422, the entire contents of which are incorporated by reference. Also, the operating modes of FIGS. 2-4 are known. However, as discussed in more detail below, the electric vehicle heating and cooling system 1 may be operated in a cold ambient battery chilling mode (FIGS. 5-6) to cool a vehicle battery 4 without activating a battery chiller 6 if the electric vehicle 100 is being charged in cold ambient conditions. Battery 4 may comprise a traction battery that supplies electric power to an electric motor (not shown) of the electric vehicle 100.

Referring again to FIG. 2, electric vehicle 100 includes a cabin liquid coolant circuit 2 that includes a cabin (e.g., passenger compartment) HVAC unit 7 including a heater core 8 that is fluidly connected to a first valve 14, a pump 15, and a PTC (electric) heater 16 by coolant lines 17A-17E. A fan 23 may be actuated to cause air "A" to flow over heater core 8 to thereby heat air A supplied to the vehicle cabin, and cool liquid coolant passing through heater core 8. Air A may be ambient air or recirculated cabin air. A battery liquid coolant circuit 3 includes a battery chiller 6, second pump 19, battery heat exchanger 5 that is thermally coupled to vehicle battery 4, and a second valve 20 that are operably interconnected by coolant lines 21A-21E. Coolant lines 22A-22C, and 17F operably interconnect the cabin circuit 2 and battery circuit 3.

The electric vehicle 100 further includes an electric vehicle control module (EVCM) 24 that may be operably connected to a climate control module (CCM) 25 by a Can Gateway Module 26. The CCM 25 is operably connected to the cabin HVAC unit 7 and the EVCM 24 is operably connected to the first and second pumps 15 and 19, respectively, the first and second valves 14 and 20, respectively, the PTC heater 16, and the battery chiller 6. The CCM 25, Can Gateway Module 26 and EVCM 24 may collectively form a control system 30 that controls the vehicle heating and cooling system 1. It will be understood that the CCM 25, Can Gateway Module 26 and EVCM 24 are merely an example of a suitable control system, and the controller 30 may comprise virtually any suitable combination of hardware and software.

During typical or "normal" operating conditions (FIG. 2), the cabin liquid coolant circuit 2 and battery liquid coolant circuit 3 operate independently, and the valves 14 and 20 do not cause coolant to flow through coolant lines 22A, 22B, and 22C. During the operating conditions of FIG. 2, the PTC heater 16 and heater core 8 are utilized to control air temperature in a vehicle cabin, and the battery heat exchanger 5 and battery chiller 6 are utilized to control (cool) a temperature of the vehicle electric battery 4 if required.

With further reference to FIG. 3, during a cold ambient operating condition, the battery liquid coolant circuit 3 may be deactivated, such that coolant does not flow through the battery heat exchanger 5 and battery chiller 6. In particular, the battery chiller 6 and pump 19 may be deactivated. However, the cabin liquid coolant circuit 2 may be activated to cause coolant to flow through the heater core 8 and PTC heater 16 as required to maintain a desired cabin temperature.

With further reference to FIG. 4, if the vehicle battery 4 requires heating, the chiller 6 may be deactivated, and the valves 14 and 20 may be configured to cause coolant to flow through PTC heater 16, heater core 8, and through battery heat exchanger 5 and back to the PTC heater 16. In this way, the PTC heater 16 may be utilized to maintain a cabin temperature (i.e. heat the cabin) and heat the vehicle battery 4 utilizing the battery heat exchanger 5.

It will be understood that the operating states described above in connection with FIGS. 2-4 are generally known. Accordingly, a more detailed description of the operating states of FIGS. 2-4 are not believed to be required.

Figure 5:
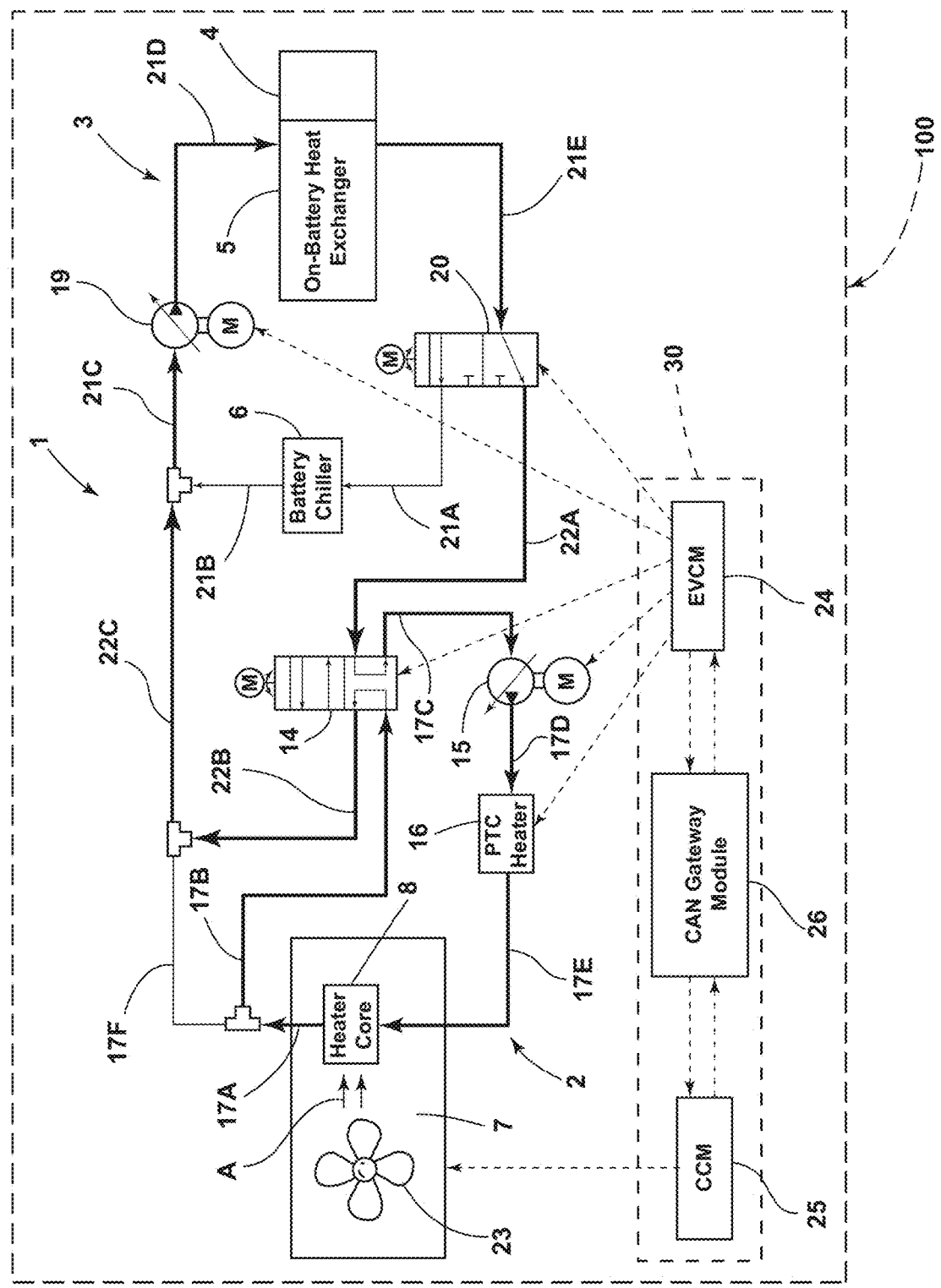
FIG. 5 is a schematic diagram showing an electric vehicle heating and cooling system in a battery cooling mode in which a heater core of a cabin HVAC unit is utilized to cool coolant from a battery heater exchanger.

With further reference to FIG. 5, the vehicle heating and cooling system 1 may also be utilized in a cold ambient battery chilling configuration or mode. As discussed above in connection with FIG. 1, a battery temperature may exceed a "Power Reduced" temperature limit BT1 during charging (e.g., fast charging) following a period in which the vehicle 100 is driven at high load conditions (e.g. a high speed, towing a trailer, etc.). For example, unless the battery 4 is cooled, the battery temperature may exceed the desired limit BT1 when (fast) charging during a time interval $t_1$-$t_2$ of FIG. 1. Although the battery chiller 6 may be utilized to cool the battery 4 during charging, the battery chiller 6 requires energy for operation.

Referring again to FIG. 5, when the vehicle heating and cooling system 1 of electric vehicle 100 is in the cold ambient battery chilling mode, the PTC heater 16 is deactivated such that coolant flowing from PTC heater 16 to heater core 8 is not heated. However, fan 23 may be activated to cause cold air A (ambient or cabin air) to heat the air A while cooling the coolant flowing through heater core 8. The coolant exiting heater core 8 is directed through first valve 14 to second pump 19 and to the battery heat exchanger 5. Because the coolant has been cooled by the heater core 8, the coolant entering the battery heat exchanger 5 is relatively cool, and thereby cools the vehicle battery 4. The coolant exiting the heat exchanger 5 flows through the second valve 20 to the first valve 14, and from the first valve 14 to the first pump 15. The heated coolant is then returned to the heater core 8 and the coolant is then cooled by heater core 8.

When the system 1 is in the cold ambient chilling mode of FIG. 5, the heater core 8 may be utilized to heat the cabin of the vehicle while cooling the vehicle battery during charging operations. The cold ambient battery chilling mode of FIG. 5 may be utilized if the electric vehicle 100 is being charged (fast charge) and the battery 4 requires cooling.

Figure 6:
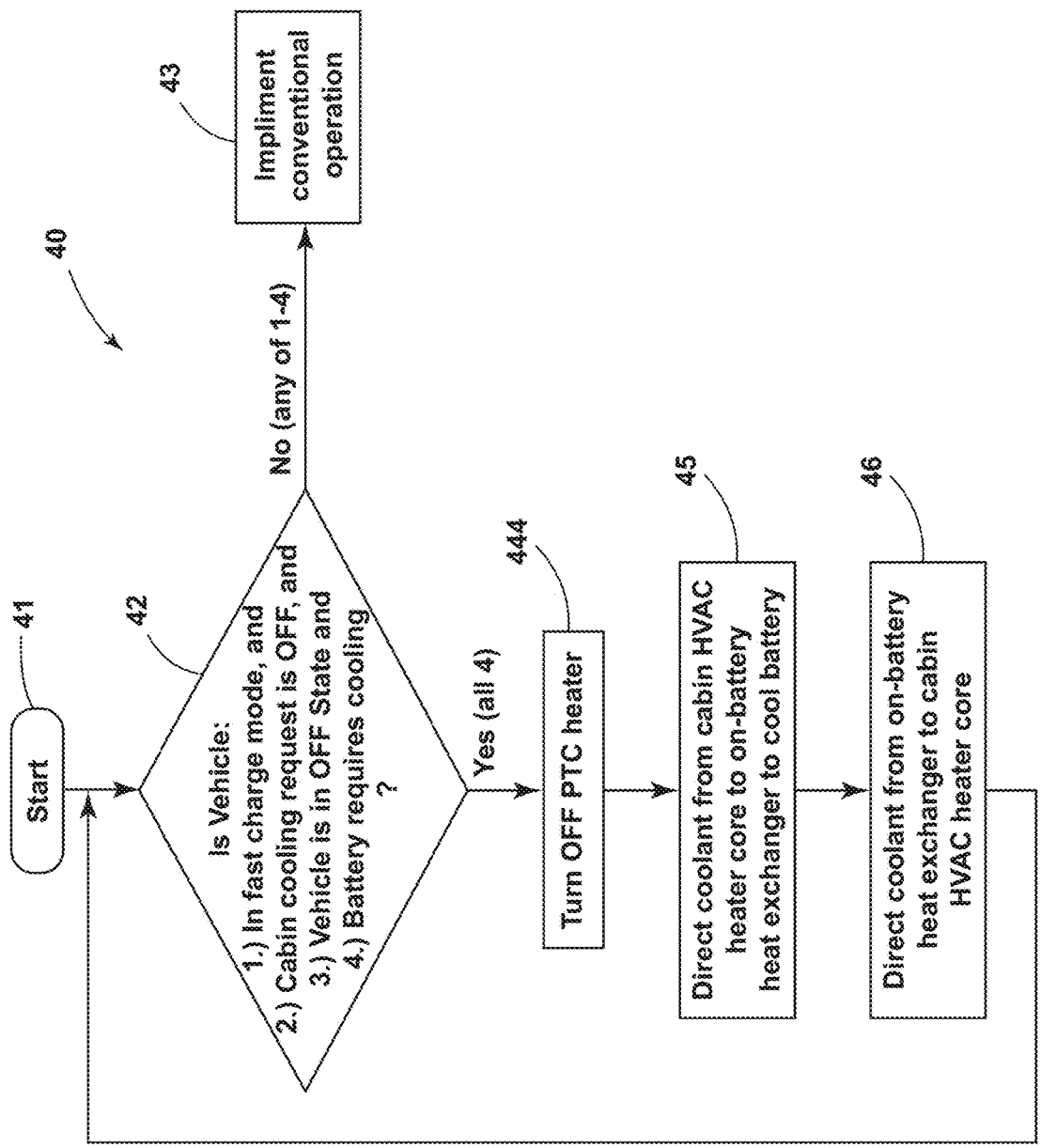
FIG. 6 is a flow chart showing operation according to FIG. 5.

More specifically, with reference to FIG. 6, the cold ambient operating mode is to be implemented. Evaluation 40 generally includes a "start" 41 followed by a step 42. At step 42, the system (e.g., controller 30) determines if the requirements (predefined operating parameter criteria) for the cold ambient mode are met. If the conditions (criteria) are not met, the system 1 returns to a conventional operating step 43. The predefined cold ambient operating mode criteria utilized at step 42 may include: 1) the electric vehicle 100 is in a fast charge mode, and 2) a cabin (e.g., passenger compartment) cooling request is OFF, and 3) the electric vehicle 100 is in an OFF state (e.g., not in operation), and 4) the battery 4 requires cooling. The battery 4 may require cooling if the temperature of the battery 4 is above the desired limit BT1 (FIG. 1), or the temperature of the battery 4 is at a temperature "BT2" (FIG. 1) that is within a predefined temperature difference "DT" of the temperature limit BT1. Controller 30 may be configured to utilize measured battery temperature, rate of charge of battery temperature (i.e., slope of line 10), charge rate, and/or other parameters to determine if predefined battery cooling criteria have been met indicating that battery cooling is required or is likely to be required. Thus, the cold ambient operating mode criteria may exist if the battery temperature is at a temperature that is below line BT1 (FIG. 1) if a lower temperature criteria (e.g. line BT2) exists.

If all four conditions of step 42 are met, the controller implements to cold ambient operating mode at steps 44-46. At step 44, the PTC heater 16 is turned off, and coolant is directed from the cabin HVAC heater core 8 to the battery heat exchanger 5 to heat the battery 4 at step 45. At step 46, coolant is directed from the battery heat exchanger 5 to the cabin HVAC heater core 8. It will be understood that the steps 44, 45, and 46 do not need to be conducted in the sequence illustrated in FIG. 6. In particular, steps 44-46 may occur simultaneously, or with a relatively short time interval, and in virtually any sequence. Also, controller 30 may be configured to implement the process of FIG. 6 by activating or deactivating the components (e.g., pumps, valves, etc.) of the system as described above in connection with FIG. 5.

The cold ambient battery chilling mode described in more detail above permits the vehicle heating and cooling system 1 to cool the vehicle battery 4 during charging operations if electric vehicle 100 is being charged in cold ambient conditions. This permits battery cooling during charging without activation of the battery chiller 6 to thereby reduce energy consumption during charging operations. Controller 30 may be configured and exit the cold ambient operating mode (step 43) to actuate battery chiller 6 if the battery temperature exceeds a predefined temperature limit during the cold ambient operating mode.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A method of implementing a cold ambient battery chilling mode in an electric vehicle having a battery, battery charging system, and a thermal control system, the thermal control system including a cabin liquid coolant circuit that is operably connected to a battery liquid coolant circuit, the method comprising:
    determining if predefined cold ambient battery chilling mode criteria is satisfied, the predefined cold ambient battery chilling mode criteria including: 1) the vehicle battery charging system is activated; 2) the cabin is not being cooled by the cabin liquid coolant circuit; 3) the electric vehicle is stopped in ambient air below a predefined cold temperature; and 4) a temperature of the battery is above a predefined fast charge temperature;
    if the predefined cold ambient battery chilling mode criteria is satisfied, implementing the cold ambient battery chilling mode by:
        utilizing cold ambient air to cool a heater core of the cabin liquid coolant circuit;
        utilizing coolant flowing from the heater core of the cabin liquid coolant circuit to a battery heat exchanger that is thermally coupled to the vehicle battery to cool the vehicle battery during charging of the vehicle battery;
        allowing coolant that has been heated by the battery heat exchanger to flow through the heater core of the cabin liquid coolant circuit to reduce a temperature of coolant exiting the heater core; and wherein:
    the electric vehicle includes a battery chiller that is deactivated when the cold ambient battery chilling mode is implemented.

2. The method of claim 1, wherein:
    the cabin liquid coolant circuit includes an electric heater that is configured to heat coolant entering the heater core, a pump configured to circulate coolant in the cabin liquid coolant circuit, and a first valve configured to selectively interconnect the cabin liquid coolant circuit to the battery liquid coolant circuit whereby the valve prevents flow of coolant from the cabin liquid coolant circuit to the heater core when the first valve is in a first state, and causes coolant to flow to the heater core from the cabin liquid coolant circuit when the first valve is in a second state;
    and wherein coolant is caused to flow from the heater core of the cabin liquid coolant circuit to the battery heat exchanger by shifting the first valve from the first state to the second state.

3. The method of claim 2, wherein:
    the electric heater is turned off when the cold ambient battery chilling mode is implemented.

4. The method of claim 3, wherein:
    the battery liquid coolant circuit includes a battery chiller that is configured to cool coolant before the coolant enters the battery heat exchanger when the battery chiller is activated, a pump configured to circulate coolant in the battery liquid coolant circuit, and a second valve configured to direct coolant exiting the battery heat exchanger to the battery chiller when the second valve is in a first state, and to direct coolant exiting the battery heat exchanger to the cabin liquid coolant circuit when the second valve is in a second state;
    wherein the second valve is in the second state when the cold ambient battery chilling mode is implemented.

5. The method of claim 4, including:
    deactivating the battery chiller when the cold ambient battery chilling mode is implemented.

6. The method of claim 5, wherein:
    the electric vehicle includes a control system; and including:
    causing the control system to determine if the predefined cold ambient battery chilling mode criteria are satisfied.

7. The method of claim 6, wherein:
    the control system comprises an electric vehicle control module (EVCM) that is operably connected to a climate control module (CCM).

8. The method of claim 7, wherein:
    the EVCM is configured to control the flow of coolant in the cabin liquid coolant circuit and in the battery liquid coolant circuit; and including:
    wherein the EVCM is configured to activate the cold ambient battery chilling mode when the predefined cold ambient battery chilling mode criteria is satisfied by: 1) causing the first valve to shift from the first state to the second state, and 2) causing the second valve to shift to the second state, and 3) deactivating the battery chiller, and 4) deactivating the electric heater.

9. The method of claim 1, wherein:
    the electric vehicle includes a traction battery;
    the coolant flows through the battery heat exchanger to cool the traction battery; and including:
    utilizing a controller to:
        determine if predefined cold ambient battery chilling mode criteria are satisfied, and when the predefined cold ambient battery chilling mode is satisfied:
        cause the heater core of the cabin liquid coolant circuit to be cooled utilizing cold ambient air;
        cause coolant exiting the heater core to cool the battery utilizing the battery heat exchanger;
        cause heated coolant from the battery heat exchanger to flow to the heater core of the cabin liquid coolant circuit; and
        deactivate the battery chiller.

10. A method of operating an electric vehicle battery charging and thermal control system in an electric vehicle, the method comprising:
    determining if predefined cold ambient battery chilling mode criteria exist;
    when predefined cold ambient battery chilling mode criteria exist, implementing a cold ambient battery chilling mode including: 1) causing coolant to flow through a heater core of a cabin heater to cool the coolant; 2) causing coolant exiting the heater core to flow through a battery heat exchanger, and 3) deactivating a battery chiller and wherein: the predefined cold ambient battery chilling mode criteria comprise one or more of 1) the vehicle battery charging system is activated; 2) the cabin is not being cooled by the cabin liquid coolant circuit; 3) the electric vehicle is stopped in ambient air below a predefined cold temperature; and 4) a temperature of the battery is above a predefined fast charge temperature.

11. The method of claim 10, Wherein:
the predefined battery cooling criteria comprises a temperature of the battery.

12. The method of claim 11, wherein:
the predefined battery cooling criteria comprises a battery temperature at which battery power is reduced.

13. The method of claim 10, wherein:
the thermal control system includes a cabin liquid coolant circuit that is operably connected to a battery liquid coolant circuit;
the cabin liquid coolant circuit includes an electric heater that is configured to heat coolant entering the heater core, a pump configured to circulate coolant in the cabin liquid coolant circuit, and a first valve configured to selectively interconnect the cabin liquid coolant circuit to the battery liquid coolant circuit whereby the valve prevents flow of coolant from the cabin liquid coolant circuit to the heater core when the first valve is in a first state, and causes coolant to flow to the heater core from the cabin liquid coolant circuit when the first valve is in a second state; and including:
causing coolant to flow from the heater core of the cabin liquid coolant circuit to the battery heat exchanger by shifting the first valve from the first state to the second state.

14. The method of claim 13, Wherein:
the electric heater is turned off when the cold ambient battery chilling mode is implemented.

15. The method of claim 14, wherein:
the battery liquid coolant circuit includes a battery chiller that is configured to cool coolant before the coolant enters the battery heat exchanger when the battery chiller is activated, a pump configured to circulate coolant in the battery liquid coolant circuit, and a second valve configured to direct coolant exiting the battery heal exchanger to the battery chiller when the second valve is in a first state, and to direct coolant exiting the battery heat exchanger to the cabin liquid coolant circuit when the second valve is in a second state;
wherein the second valve is in the second state when the cold ambient battery chilling mode is implemented.

16. The method of claim 15, wherein:
deactivating the battery chiller when the cold ambient battery chilling mode is implemented.

* * * * *